US009742128B2

(12) United States Patent
Justice et al.

(10) Patent No.: US 9,742,128 B2
(45) Date of Patent: Aug. 22, 2017

(54) SMART PLUG HAVING PLUG BLADE DETECTION

(71) Applicant: Grid Connect, Inc., Naperville, IL (US)

(72) Inventors: Adam Justice, Naperville, IL (US); Cristian Codreanu, Naperville, IL (US); Orville Dodd, Naperville, IL (US)

(73) Assignee: Grid Connect, Inc., Naperville, IL (US)

( * ) Notice: Subject to any disclaimer, the term of this patent is extended or adjusted under 35 U.S.C. 154(b) by 282 days.

(21) Appl. No.: 14/753,753

(22) Filed: Jun. 29, 2015

(65) Prior Publication Data

US 2016/0380392 A1 Dec. 29, 2016

(51) Int. Cl.

| | |
|---|---|
| ***H02J 1/10*** | (2006.01) |
| ***H02J 3/38*** | (2006.01) |
| ***H02J 7/34*** | (2006.01) |
| ***H01R 13/713*** | (2006.01) |
| ***H01R 13/66*** | (2006.01) |

(52) U.S. Cl.

CPC ....... *H01R 13/713* (2013.01); *H01R 13/6683* (2013.01)

(58) Field of Classification Search

USPC .................................................... 307/18, 105

See application file for complete search history.

(56) References Cited

U.S. PATENT DOCUMENTS

| | | | | |
|---|---|---|---|---|
| 4,289,365 | A | 9/1981 | Rutgers | |
| 4,508,400 | A | 4/1985 | Herbert | |
| 5,293,098 | A * | 3/1994 | Brownell | H05B 33/08 315/169.3 |
| 5,814,947 | A * | 9/1998 | Brownell | H05B 33/08 315/169.3 |
| 6,078,113 | A | 6/2000 | True et al. | |
| 6,283,787 | B1 | 9/2001 | Chou | |
| 6,428,334 | B1 | 8/2002 | Skarie et al. | |
| 6,464,526 | B1 | 10/2002 | Seufert et al. | |
| 7,186,147 | B1 | 3/2007 | Chou et al. | |
| 7,575,454 | B1 | 8/2009 | Aoki et al. | |
| 7,575,467 | B2 | 8/2009 | Ferguson et al. | |
| 7,635,284 | B1 * | 12/2009 | Nemir | H02M 5/2573 315/307 |
| 7,695,310 | B1 | 4/2010 | Boyer et al. | |
| 7,789,697 | B2 | 9/2010 | Fiennes | |

(Continued)

*Primary Examiner* — Adam Houston

(74) *Attorney, Agent, or Firm* — The Polit IP Law Group, Ltd.

(57) ABSTRACT

A smart plug system is disclosed. The smart plug system includes a power plug configured to receive an alternating current power signal from shore power, a power receptacle configured to receive a plug having a plug blade, and a plug detection switch configured to detect receipt of the plug blade in the power receptacle. A rectifier circuit is included to rectify the alternating current power signal received at the power plug when the plug detection switch is actuated by receipt of the plug blade. The plug detection switch is further configured to prevent rectification of the alternating current power signal by the rectifier circuit when the plug blade is removed from the power receptacle. A logic level converter is included to receive the rectified power signal to convert the rectified power signal to a logic level signal.

20 Claims, 5 Drawing Sheets

(56) References Cited

U.S. PATENT DOCUMENTS

| | | | |
|---|---|---|---|
| 7,825,546 B2 | 11/2010 | Li et al. | |
| 7,908,414 B2 | 3/2011 | Combs et al. | |
| 8,360,801 B2 | 1/2013 | Lynch et al. | |
| 8,414,319 B2 | 4/2013 | Patel et al. | |
| 8,535,087 B1 | 9/2013 | McKee et al. | |
| 8,712,196 B2 | 4/2014 | Shang et al. | |
| 8,747,147 B2 | 6/2014 | Yu et al. | |
| 8,772,654 B2 | 7/2014 | Tziviskos et al. | |
| 8,870,591 B2 | 10/2014 | Takakura | |
| 2003/0022550 A1 | 1/2003 | Chowdhury | |
| 2004/0120168 A1* | 6/2004 | Miles | H01R 13/6675 363/44 |
| 2004/0155638 A1* | 8/2004 | Flaherty | H01H 47/325 323/282 |
| 2009/0192927 A1 | 7/2009 | Berg et al. | |
| 2009/0263999 A1 | 10/2009 | Onoue | |
| 2010/0060233 A1 | 3/2010 | Kung et al. | |
| 2010/0070219 A1* | 3/2010 | Azancot | H02J 5/005 702/62 |
| 2010/0279532 A1 | 11/2010 | Inage et al. | |
| 2011/0025263 A1* | 2/2011 | Gilbert | H02J 7/0044 320/108 |
| 2011/0266869 A1 | 11/2011 | Katru et al. | |
| 2013/0164971 A1 | 6/2013 | Chung et al. | |
| 2013/0237085 A1 | 9/2013 | Kim et al. | |
| 2013/0330962 A1 | 12/2013 | Tziviskos et al. | |
| 2014/0101346 A1 | 4/2014 | Naaman | |
| 2014/0203638 A1 | 7/2014 | Keswani et al. | |
| 2014/0252872 A1 | 9/2014 | Azancot et al. | |
| 2016/0294227 A1* | 10/2016 | Podkamien | H02J 5/00 |
| 2017/0072807 A1* | 3/2017 | Matsumoto | B60L 11/18 |

* cited by examiner

SMART PLUG HAVING PLUG BLADE DETECTION

BACKGROUND

Various electrical receptacles are available in which a detection switch is incorporated in the receptacle to detect the presence of a properly inserted plug connector. Usually, the receptacle does not receive current unless the detection switch is actuated. Such systems might be used as a simple safety measure. For instance, the detection switch might be used to detect the presence of a ground terminal of a three-pronged plug. If a two pronged plug is inserted into the receptacle, the switch will not be actuated and no current will be supplied to the receptacle unless a proper three-pronged plug is inserted, whereupon the ground terminal actuates the detection switch.

In certain "smart" power receptacles, it may be desirable to prevent supply power from reaching the receptacle unless a power plug is inserted. The detection switch might be actuated by any one of the prongs or blades of the power receptacle, at which point the detection switch is actuated to tell a controller to send power to the receptacle.

In some detection switches, the contacts of the switches are deflected indirectly by a terminal prong or blade through a separator made of an insulating material. This is particularly true in a power receptacle since the detection switch is usually a low voltage switch. The insulator provides electrical isolation between the low voltage circuit and the higher voltage circuit of the power receptacle.

One of the problems with electrical receptacles that embody such detection switches is that the receptacles may be unduly complicated or require excessive mechanical components to ensure that the detection switch provides a detection signal for use by a controller. Such receptacles frequently are not cost effective because of assembly procedures involved in assembling the detection switch within an otherwise simple electrical receptacle.

SUMMARY

A smart plug system is disclosed. The smart plug system includes a power plug configured to receive an alternating current power signal from shore power. The smart plug system also includes a power receptacle configured to receive a plug having a plug blade, and a plug detection switch configured to detect receipt of the plug blade in the power receptacle. A rectifier circuit is included in the smart plug system to rectify the alternating current power signal received at the power plug when the plug detection switch is actuated by receipt of the plug blade. The plug detection switch prevents rectification of the alternating current power signal by the rectifier circuit when the plug blade is removed from the power receptacle. A logic level converter is included in the smart plug system, and is configured to receive the rectified power signal to convert the rectified power signal to a logic level signal.

In one example, the rectifier circuit may be a half-wave rectifier. When using a half-wave rectifier, the logic level converter may be configured to provide a pulsed logic level signal in response to receipt of the rectified alternating current power signal.

A method for use in a smart power switch is also disclosed. The method includes detecting insertion of a plug blade in a power receptacle of the smart power switch, and rectifying an alternating current power signal received at the power receptacle upon detecting the insertion of the plug blade to generate a rectified power output signal. Generation of the rectified power output signal is prevented when the plug blade is not inserted in the power receptacle. When the plug blade is inserted, the rectified power output signal is converted to a logic level signal.

DETAILED DESCRIPTION

Figure 1:
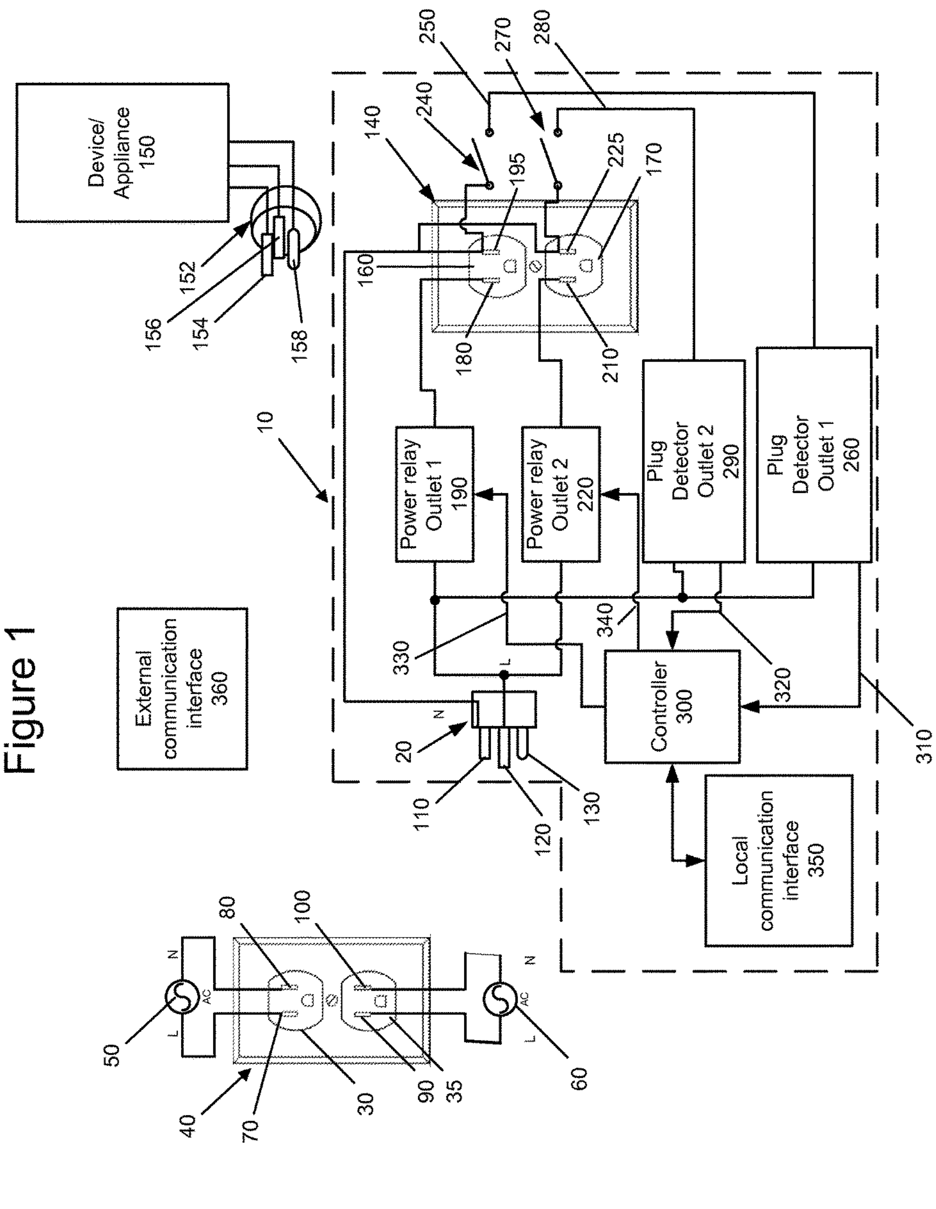
FIG. 1 is a block diagram of a smart switch having a plug that may be connected to a receptacle of a power outlet.

FIG. 1 is a block diagram of a smart switch 10 having a plug 20 that may be connected to either receptacle 30 or 35 of a power outlet 40. Each receptacle 30, 35, in turn, may be connected to its own source of AC shore power 50, 60. Each source of AC shore power 50, 60 provides respective line power signals and neutral power signals to respective fittings of receptacles 30, 35. More particularly, AC shore power 50 provides a line power signal (L) at line fitting 70 and a neutral power signal (N) at neutral fitting 80 of receptacle 30. Similarly, AC shore power 60 provides a line power signal (L) at line fitting 90 and a neutral power signal (N) at neutral fitting 100 of receptacle 35.

In the example of FIG. 1, the plug 20 includes a neutral blade 110, a line blade 120, and an optional ground plug 130. The plug 20 may be engaged with either receptacle 30 or receptacle 35 of the power outlet 40. For purposes of the following discussion, it is assumed that the plug 20 engages receptacle 35 of the power outlet 40. To this end, the neutral blade 110 is configured to receive the neutral power signal at neutral fitting 80 of power outlet 40. The line blade 120 is configured to receive the line power at line fitting 70 of power outlet 40.

The smart switch 10 also includes a power outlet 140 configured to provide AC power signals from the smart switch 10 to a device/appliance 150 through plug 152. Plug 152 is configured with a neutral blade 154, a line blade 156, and an optional ground connector 158. In this example, the power outlet 140 includes a first receptacle 160 and a second receptacle 170, either of which can be connected to the device/appliance 150 through plug 152. Here, the first receptacle 160 includes a line fitting 180 configured to receive the line power signal from line blade 120 of plug 20 through a first power relay 190. The first receptacle 160 also includes a neutral fitting 195 configured to receive the neutral power signal from neutral blade 110 of plug 20. Similarly, the second receptacle 170 includes a line fitting 210 configured to receive the line power signal from line blade 120 of plug 20 through a second power relay 220. The second receptacle 170 also includes a neutral fitting 225 configured to receive the neutral power signal from neutral blade 110 of plug 20.

The first receptacle 160 and second receptacle 170 are each associated with a respective plug detection switch. The plug detection switches are configured to detect whether a plug blade is inserted in the respective power receptacle. Here, since there are two power receptacles (although other configurations may include only one, or more than two power receptacles), there are two plug detection switches, each respectively associated with one of the two power receptacles.

In the example of FIG. 1, the plug detection switch 240 of the first receptacle 160 is configured at the neutral fitting 195. The plug detection switch 240 closes in response to receipt of a power plug blade within the neutral fitting 195. Here, the power plug blade is the neutral blade 154 of plug 152, which actuates the plug detection switch 240 when the plug 152 is inserted into the first receptacle 160. When the plug detection switch 240 is closed, the neutral power signal is through-connected from the first receptacle 160 to a first detector output 250 of the plug detection switch 240. The first detector output 250, in turn, is provided to an input of a first plug detector 260. As will be explained in further detail below in connection with one example, the first plug detector 260 may include a rectifier circuit that is configured to rectify the alternating current power signal received at the plug 20 when the plug detection switch 240 is actuated by insertion of the line blade 156. When deactivated, the plug detection switch 240 opens to inhibit rectification of the alternating current power signal when the line blade 156 is removed from the first receptacle 160.

Similarly, a plug detection switch 270 of receptacle and 70 is configured at the neutral fitting 225. The plug detection switch 270 closes in response to receipt of a power plug blade within the neutral fitting 225. Here, the power plug blade is the neutral blade 154 of plug 152, which actuates the plug detection switch 270 when the plug 152 is inserted into second receptacle 170. When the plug detection switch 270 is closed, the neutral power signal is through-connected from the second receptacle 170 to a detector output 280 of plug detection switch 270. The detector output 280, in turn, is provided to an input of a second plug detector 290. Again, as will be explained in further detail below in connection with one example, the second plug detector 290 may include a rectifier circuit that is configured to rectify the alternating current power signal received at the plug 20 when the plug detection switch 270 is actuated by receipt of the line blade 156. When deactivated, the plug detection switch 240 opens to inhibit rectification of the alternating current power signal when the line blade 156 is removed from the second receptacle 170.

As shown, the respective output of each plug detector is provided to a corresponding input of a controller 300. In this example, the output of the first plug detector 260 is provided to the controller 300 at line 310. The output of the second plug detector 290 is provided to the controller 300 at line 320. The signals at lines 310 and 320 are logic level signals indicative of whether a plug is present in the first receptacle 160 and/or the second receptacle 170.

The controller 300 actuates the power relays to either connect or disconnect the line power signal from plug 20 to one or both power receptacles of the power outlet 140. In FIG. 1, controller 300 provides a first relay control signal 330 to the first power relay 190. In response to the first relay control signal 330, the first power relay 190 either through-connects or disconnects the line power signal from plug 20 to the line fitting 180 of the first receptacle 160. Similarly, controller 300 provides a second relay control signal 340 to the second power relay 220. In response to the second relay control signal 340, the second power relay 220 either through-connects or disconnects the line power signal from plug 20 to the line fitting 210 of the second receptacle 170.

Controller 300 may send and receive data used to determine whether or not power is to be applied to one or both of the first receptacle 160 and second receptacle 170 through their respective power relays 190 and 220. To this end, the smart switch 10 may include a local communication interface 350 through which it may receive control criterion directly through a user interface disposed on the smart switch 10 (not shown) or from an external communication interface 360. The external communication interface 360 and local communication interface 350 may communicate with one another using a wired and/or wireless network protocol. For example, the local communication interface 350 may be connected to a wireless network and/or wired network that is also accessible to the external communication interface 360. In such instances, the external communication interface 360 may be in the form of a keypad (mechanical and/or touch screen) and/or intelligent device (i.e., a smart phone, tablet, laptop, etc.). Programming may be provided to allow an intelligent device to communicate with the controller 300 over the Internet.

Local communication interface 350 may also provide data to the external communication interface 360 indicating the state of one or both the first power relay 190 and second power relay 220. The local communication interface 350 may also provide data indicative of whether a plug is inserted into one or both the first receptacle 160 and second receptacle 170. This data may be used to determine whether the line power signal is to be provided from the plug 20 to the first receptacle 160 and/or second receptacle 170 through the respective power relays 190 and 220.

Figure 2:
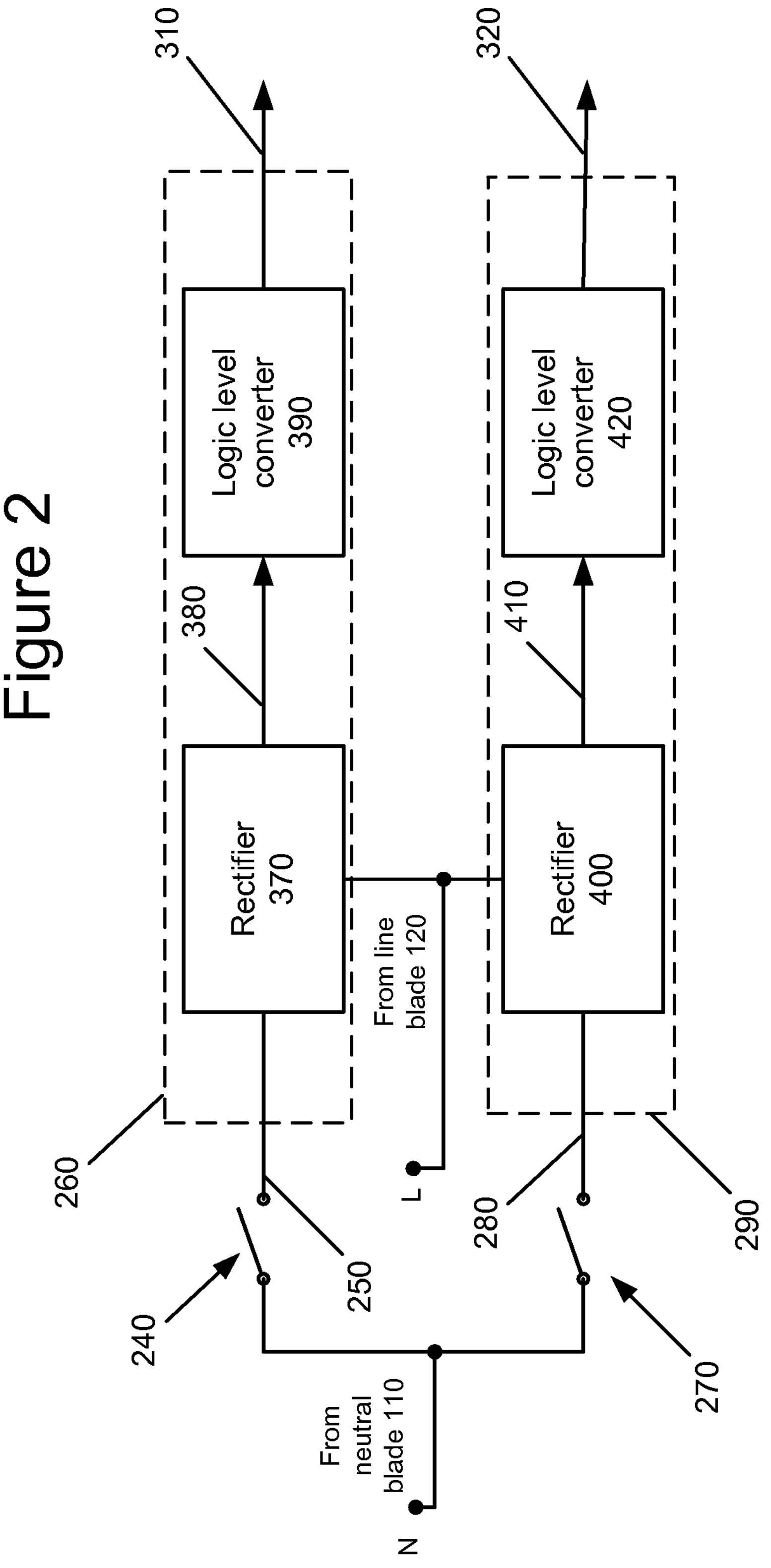
FIG. 2 shows one manner in which the plug detectors may be constructed for use in the smart switch of FIG. 1.

FIG. 2 shows one manner in which the first plug detector 260 and second plug detector 290 may be constructed for use in the smart switch 10 of FIG. 1. In this example, first plug detector 260 includes a first rectifier 370 having a first input configured to receive the first detector output 250 from plug detection switch 240, and a second input configured to receive the line power signal from line blade 120 of plug 20. When plug detection switch 240 is actuated by insertion of a blade into neutral fitting 195, the neutral power signal is through-connected to the first detector output 250 to provide a closed circuit path within the first rectifier 370 to generate a rectified version of the power signals received by the first rectifier 370 from plug 20. The rectified power signal 380 is provided at the first rectifier output to an input of a first logic level converter 390. The first logic level converter 390 is configured to receive the rectified power signal 380 to convert the rectified power signal 380 to a logic level signal, which has voltage level properties that can be used as logic signals by controller 300. When the plug detection switch 240 is deactivated by removal of the plug from the neutral fitting 195, the neutral power signal is disconnected from the first rectifier 370. This results in an open circuit condition within the first rectifier 370, which prevents rectification of the power signals within the first rectifier 370.

Similarly, the second plug detector 290 includes a second rectifier 400 having a first input configured to receive the detector output 280 from plug detection switch 270, and a second input configured to receive the line power signal from line blade 120 of plug 20. When plug detection switch 270 is actuated by insertion of a blade into neutral fitting 225, the neutral power signal is through-connected to the detector output 280 to provide a closed circuit path within the second rectifier 400 to generate a rectified version of the power signals received by the second rectifier 400 from plug 20. The rectified power signal 410 is provided at the second rectifier output to an input of a second logic level converter 420. The second logic level converter 420 is configured to receive the rectified power signal 410 to convert the rectified power signal 410 to a logic level signal, which has voltage level properties that can be used as logic signals by controller 300. When the plug detection switch 270 is deactivated by removal of the blade from the neutral fitting 225, the neutral power signal is disconnected from the second rectifier 400. This results in an open circuit condition within the second rectifier 400, which prevents rectification of the power signals within the second rectifier 400.

Figure 3:
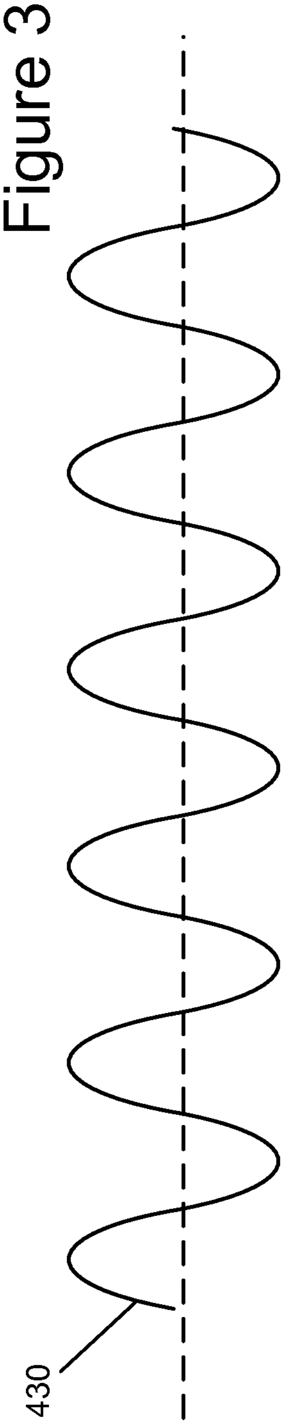
FIGS. 3-5 illustrate waveforms occurring at various nodes in the exemplary plug detection embodiment shown in FIG. 2.
Figure 4:
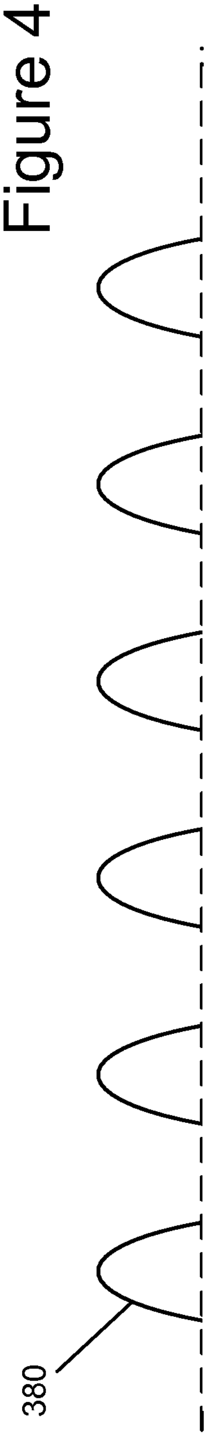
Figure 5:
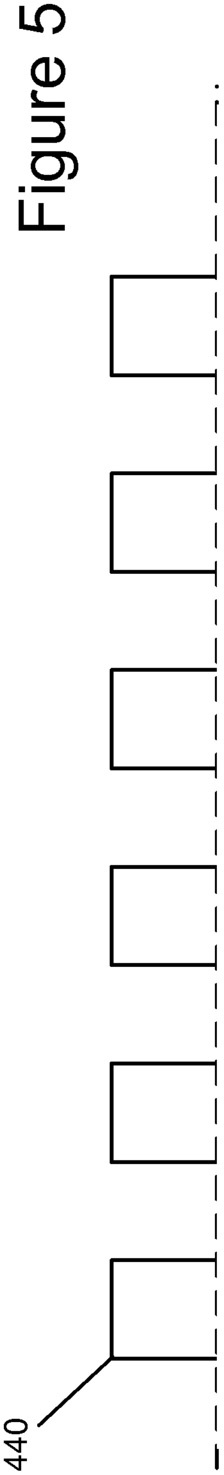

FIGS. 3-5 illustrate waveforms occurring at various nodes in the exemplary plug detection embodiment shown in FIG. 2. For purposes of simplicity, only the waveforms associated with the first plug detector 260 are shown.

FIG. 3 shows the AC power signal 430 occurring between the neutral blade 110 and line blade 120 of plug 20. When the plug detection switch 240 is actuated by insertion of a blade into neutral fitting 195, the line power signal and the neutral power signal are provided to the input of the first rectifier 370. Here, it is assumed that the first rectifier 370 is a half-wave rectifier, which generates a half-wave rectified power signal as the rectified power signal 380. The waveform of the rectified power signal 380 is shown in FIG. 4. As shown, the rectified power signal 380 corresponds to a rectified version of the waveform shown in FIG. 3.

The rectified power signal 380 is provided to the input of the first logic level converter 390. The first logic level converter 390 is configured to convert the rectified power signal 380 to a logic level signal at line 310. As shown in FIG. 5, the logic level signal generated by the first logic level converter 390 may be in the form of logic level pulses 440. The logic level pulses 440 may correspond to standard TTL logic level signals, or any other logic levels that may be used at controller 300.

The logic level pulses 440 are provided to the controller 300. In one example, the logic level pulses 440 may be provided to an input pin of the controller 300. The controller 300 may execute a polling operation at the input pin to determine the state of the signal at line 310. The polling operation should be executed at a frequency that is high enough to ensure detection of the active portions of the logic level pulses 440 when the logic level pulses 440 are present. If executed in this manner, the controller 300 will detect the logic level pulses 440 when a blade is inserted in neutral fitting 195, and will not detect the logic level pulses 440 when the blade is not inserted in neutral fitting 195.

Additionally, or in the alternative, the logic level pulses 440 may be used to trigger an interrupt signal of controller 300. In one example, the interrupt is only generated when the logic level pulses were 440 are present. The corresponding interrupt routine may then set/determine the insertion status of a blade at neutral fitting 195 for use in further processing. If the interrupt is not triggered within a predetermined time window, the controller 300 may determine or set that the blade is not present.

Although FIGS. 3-5 show waveforms associated with half-wave rectification of the AC power signal, the first rectifier 370 and a second rectifier 400 may be constructed is full-wave rectifiers. In such instances, the rectified power signal 380 is at a first generally constant signal state (i.e., high voltage level) when a blade is inserted into neutral fitting 195, and at a second generally constant signal state (i.e., zero voltage level and/or high impedance state) when a blade is not present in neutral fitting 195. Similarly, in such instances, the logic level signal at line 310 is at a "true" logic level when the rectified power signal 380 is at the first generally constant signal state, and at a "false" logic level when the rectified power signal 380 is at the second generally constant signal state.

Figure 6:
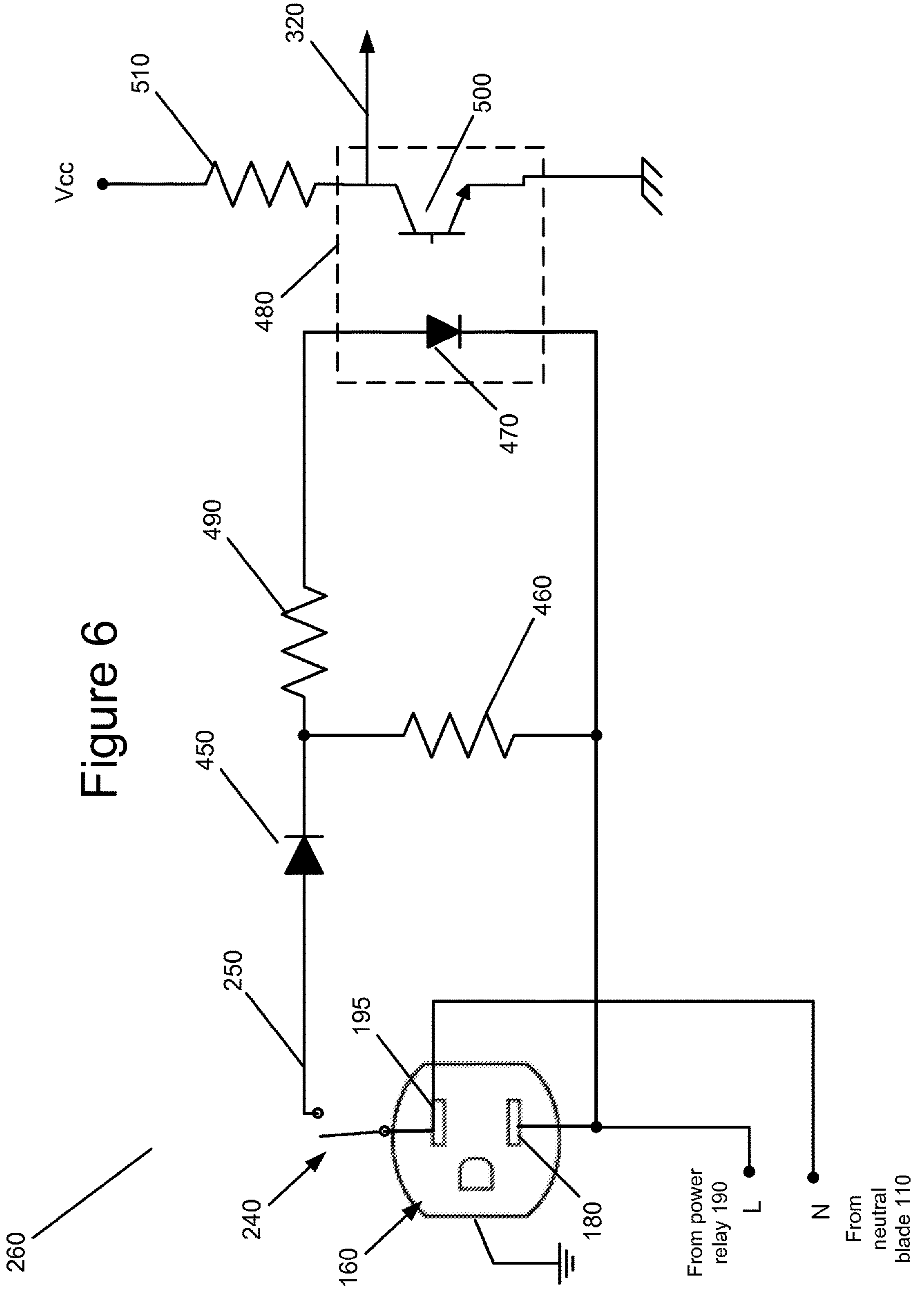
FIG. 6 shows one example of a plug detector employing a half-wave rectifier.

FIG. 6 shows one example of a plug detector employing a half-wave rectifier. For purposes of simplicity, only the first plug detector 260 is described. However, the second plug detector 290 may be similarly constructed.

In FIG. 6, the first plug detector 260 includes a diode 450 having an anode terminal configured to receive the first detector output 250 and a cathode terminal configured to receive the line power signal through resistor 460. The cathode terminal of diode 450 is further connected to the anode terminal of a photodiode 470 of an optical coupler 480 through resistor 490. Optical emissions from photodiode 470 are sensed by a photodetector 500 that is connected to logic level voltage Vcc through resistor 510 to generate pulsed logic level signals at line 320 to controller 300.

Figure 8:
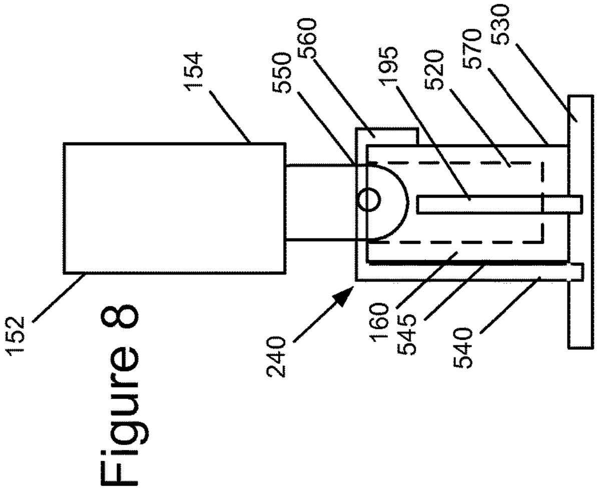
Figure 7:
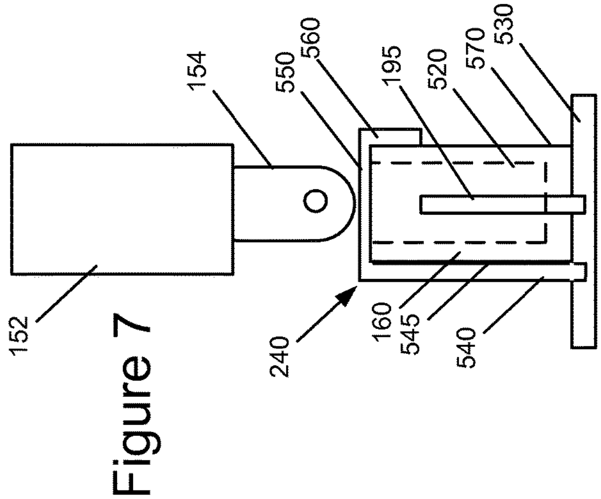

FIGS. 7-8 show one manner in which a plug detection switch may be disposed and operated at a neutral fitting of a receptacle. Here, only the first receptacle 160 is described. However the second receptacle 170 may be similarly fitted with a plug detection switch.

As shown, the first receptacle 160 includes a neutral fitting slot 520 in which the neutral fitting 195 is disposed. The neutral fitting 195 is configured to receive the neutral power signal from the neutral blade 110 of plug 20 along one or more traces of a printed circuit board 530.

The plug detection switch 240 may be formed as an integral piece of conductive material (e.g., copper). In this example, the plug detection switch 240 includes an elongated portion 540 extending from the printed circuit board 530. The elongated portion 540 extends from the printed circuit board 530 proximate to an exterior wall 545 of the first receptacle 160, and terminates at a transverse portion 550. The transverse portion 550 extends from the elongated portion 540 across the opening of the neutral fitting slot 520. A tab 560 continues from the transverse portion 550 and proceeds to a position in which it is generally adjacent an exterior wall 570 of the receptacle 160.

Figure 9:
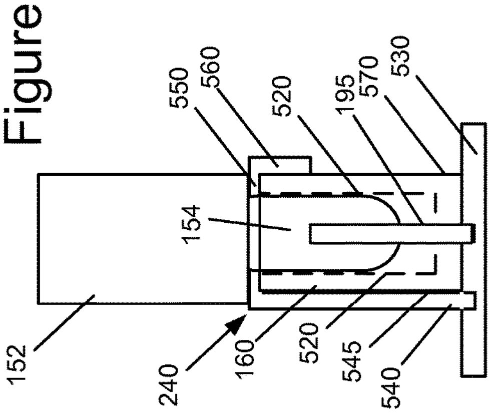
FIGS. 7-9 show one manner in which a plug detection switch may be disposed and operate at a neutral fitting of a receptacle.

The plug detection switch 240 may be held at the position shown in FIGS. 7-9 in a number of different manners. In one example, the elongated portion 540 and tab 560 are spaced from one another so that the plug detection switch 240 may securely engage the exterior walls 545 and 570 of the receptacle 160, while the elongated portion 540 is secured to the printed circuit board 530. This allows for press fitting of the plug detection switch 240 in its desired position. Additionally, or in the alternative, an adhesive may be used between one or more exterior surfaces of the receptacle 160 and one or more interior surfaces of the plug detection switch 240. Further securement techniques may also be used (e.g., mechanical fasteners, thermal fitting, etc.).

One manner in which the plug detection switch 240 may operate is shown in the combination of FIGS. 7-9. In FIG. 7, the neutral blade 154 of plug 152 is completely disengaged from physical contact with the neutral fitting 195 of receptacle 160. In this state, the plug detection switch 240 is not active since it does not provide a conductive path between the neutral blade 154 and neutral fitting 195.

In FIG. 8, the neutral blade 154 of plug 152 is only partially inserted in the neutral fitting slot 520. In this state, the neutral blade 154 electrically contacts transverse portion 550 but does not contact the neutral fitting 195. This engagement provides an electrically conductive path between the neutral blade 154 and the plug detection switch 240. However, the plug detection switch 240 is still not active since the neutral blade 154 does not provide in electrically conductive path between the plug detection switch 240 and the neutral fitting 195.

In FIG. 9, the neutral blade 154 is completely inserted into the neutral fitting slot 520 so that it is in electrical contact with the neutral fitting 195. In this position, the neutral blade 154 provides an electrically conductive path between the neutral fitting 195 and plug detection switch 240. This effectively actuates the plug detection switch 240 to provide the neutral power signal at neutral fitting 195 to the input of the first plug detector 260.

Figure 10:
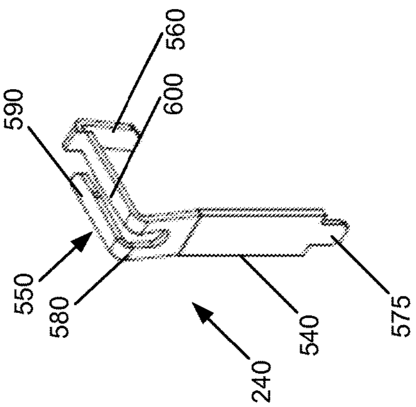
FIG. 10 illustrates one manner in which the plug detection switch of FIGS. 7-9 may be constructed.

FIG. 10 illustrates one manner in which the plug detection switch 240 of FIGS. 7-9 may be constructed. In this example, the elongated portion 540 includes a first end having a conductive tab 575 configured for connection to the printed circuit board 530. A second end of the elongated portion 540 includes an elbow forming a transition section 580 between the elongated portion 540 and transverse portion 550. The transition section 580 is split so that the transverse portion 550 is formed as separate transverse arms 590, 600 that are generally parallel with one another. The spacing between the separate transverse arms 590, 600 is selected to allow insertion of the neutral blade 154 while concurrently facilitating engagement between one or both of the separate transverse arms 590, 600 and the neutral fitting 195.

It will be appreciated that the foregoing disclosure provides examples of at least one system and technique. However, it is contemplated that other implementations of the system may differ in detail from the foregoing examples. All references in the disclosure are intended to reference particular examples and are not intended to imply any limitation as to the general scope of the disclosure.

The invention claimed is:

1. A smart plug comprising:

a power plug configured to receive an alternating current power signal from shore power;

a power receptacle configured to receive a plug having a plug blade;

a plug detection switch configured to detect receipt of the plug blade in the power receptacle;

a rectifier circuit configured to rectify the alternating current power signal received at the power plug when the plug detection switch is actuated by receipt of the plug blade, wherein the plug detection switch prevents rectification of the alternating current power signal by the rectifier circuit when the plug blade is removed from the power receptacle; and a logic level converter configured to receive the rectified power signal to convert the rectified power signal to a logic level signal.

2. The smart plug of claim 1, wherein the rectifier circuit is a full-wave rectifier.

3. The smart plug of claim 2, wherein the logic level converter is configured to provides a first constant logic level signal in response to receipt of the rectified alternating current power signal, and to provide a second constant logic level signal absent receipt of the rectified alternating current power signal.

4. The smart plug of claim 1, wherein the rectifier circuit is a half-wave rectifier.

5. The smart plug of claim 4, wherein the logic level converter is configured to provides a pulsed logic level signal in response to receipt of the rectified alternating current power signal.

6. The smart plug of claim 5, wherein the logic level converter is configured to provide a constant logic level signal absent receipt of the rectified alternating current power signal.

7. The smart plug of claim 1, wherein the logic level converter is an optical converter having an input configured to receive the rectified alternating current signal, and an output providing the logic level signal.

8. The smart plug of claim 1, further comprising a processor configured to receive the logic level signal from the logic level converter.

9. The smart plug of claim 8, wherein the processor is configured to poll the logic level signal to detect receipt of a plug blade in the power receptacle.

10. The smart plug of claim 8, wherein receipt of the logic level signal from the logic level converter generates an interrupt at the processor.

11. A smart plug comprising:

a power receptacle configured to receive a line power signal and a neutral power signal;

a plug detection switch configured at a neutral fitting of the power receptacle, wherein the plug detection switch closes in response to receipt of a power plug blade within the neutral fitting, wherein receipt of the power plug blade within the neutral fitting through-connects the neutral power signal from the power receptacle to a detector output of the plug detection switch;

a rectifier circuit configured to receive the line power signal and the detector output, wherein the rectifier circuit is configured to provide a rectified output signal corresponding to the line power signal when the neutral power signal is received from the detector output; and a logic level converter configured to receive the rectified output signal and to convert the rectified output signal to a logic level signal.

12. The smart plug of claim 11, wherein the rectifier circuit is a half-wave rectifier.

13. The smart plug of claim 12, wherein the logic level converter is configured to provide a pulsed logic level signal in response to receipt of the rectified alternating current power signal.

14. The smart plug of claim 13, wherein the logic level converter is configured to provide a constant logic level signal absent receipt of the rectified alternating current power signal.

15. The smart plug of claim 12, wherein the logic level converter is an optical converter having an input configured to receive the rectified alternating current signal, and an output providing the logic level signal.

16. The smart plug of claim 11, further comprising a processor configured to receive the logic level signal from the logic level converter.

17. The smart plug of claim 16, wherein the processor is configured to poll the logic level signal to detect receipt of the plug blade in the power receptacle.

18. The smart plug of claim 16, wherein receipt of the logic level signal from the logic level converter generates an interrupt at the processor upon receipt of the rectified alternating current signal.

19. A method for use in a smart power switch, the method comprising:

detecting insertion of a plug blade in a power receptacle of the smart power switch;

rectifying an alternating current power signal received at the power receptacle upon detecting the insertion of the plug blade to generate a rectified power output signal;

preventing generation of the rectified power output signal when the plug blade is not inserted in the power receptacle; and converting the rectified power output signal to a logic level signal when the plug blade is inserted.

20. The method of claim 19, wherein the rectified power output signal is converted to a pulsed logic level signal.

* * * * *